(12) United States Patent
De Miranda et al.

(10) Patent No.: US 9,017,603 B2
(45) Date of Patent: Apr. 28, 2015

(54) MAGNESIUM BASED-ALLOYS FOR HYDROGEN STORAGE

(75) Inventors: Paulo Emílio Valadão De Miranda, Barra da Tijuca (BR); Glória Isabel Duarte Poveda, Copacabana (BR); Luiz Alberto da Cunha Bustamante, Asa Sul Distrito Federal (BR)

(73) Assignee: COPPE/UFRJ—Coordenacao dos Programmas de Pos Graduacao de Enganharla da Universidade Federal do Rio de Janeiro, Rio de Janeiro (BR)

( * ) Notice: Subject to any disclaimer, the term of this patent is extended or adjusted under 35 U.S.C. 154(b) by 497 days.

(21) Appl. No.: 12/227,053

(22) PCT Filed: Jun. 6, 2007

(86) PCT No.: PCT/BR2007/000140
§ 371 (c)(1),
(2), (4) Date: Nov. 4, 2008

(87) PCT Pub. No.: WO2007/140556
PCT Pub. Date: Dec. 13, 2007

(65) Prior Publication Data
US 2009/0246069 A1    Oct. 1, 2009

(30) Foreign Application Priority Data
Jun. 6, 2006 (BR) ..................... 0602153

(51) Int. Cl.
*C22C 23/00* (2006.01)
*C01B 3/00* (2006.01)
(Continued)

(52) U.S. Cl.
CPC ............... *C22C 23/02* (2013.01); *C01B 3/0047* (2013.01); *C01B 3/0057* (2013.01); *C22C 1/002* (2013.01); *C22C 45/005* (2013.01); *F17C 11/005* (2013.01); *H01M 4/383* (2013.01);
(Continued)

(58) Field of Classification Search
CPC .. C01B 3/0047; C01B 3/0052; C01B 3/0057; C22C 45/005; H01M 4/46; H01M 4/383
USPC .......................................... 420/405, 402, 407
See application file for complete search history.

(56) References Cited

U.S. PATENT DOCUMENTS 6,726,783 B1 * 4/2004 Young et al. ................... 148/420
2005/0279427 A1 * 12/2005 Park et al. ...................... 148/403

FOREIGN PATENT DOCUMENTS

JP    2002105564 A * 4/2002 ............. C22C 19/00

OTHER PUBLICATIONS

Guo. "Artificial neural network modelling of hydrogen storage properties of Mg-based alloys." Materials Science and Engineering A365 (2004) 219-227.*

(Continued)

*Primary Examiner* — Kaj K Olsen
*Assistant Examiner* — Alexander Polyansky
(74) *Attorney, Agent, or Firm* — Fildes & Outland, P.C.

(57) ABSTRACT

Magnesium-based hydrogen storage alloys with addition of transition and rare earth elements were produced by conventional induction melting and by rapid solidification. The magnesium based-alloys of this invention posses reversible hydrogen storage capacities ranging from 3 to over 6 wt. %, and excellent performance on the hydrogen absorption and desorption kinetics.

8 Claims, 7 Drawing Sheets

Figure 1:
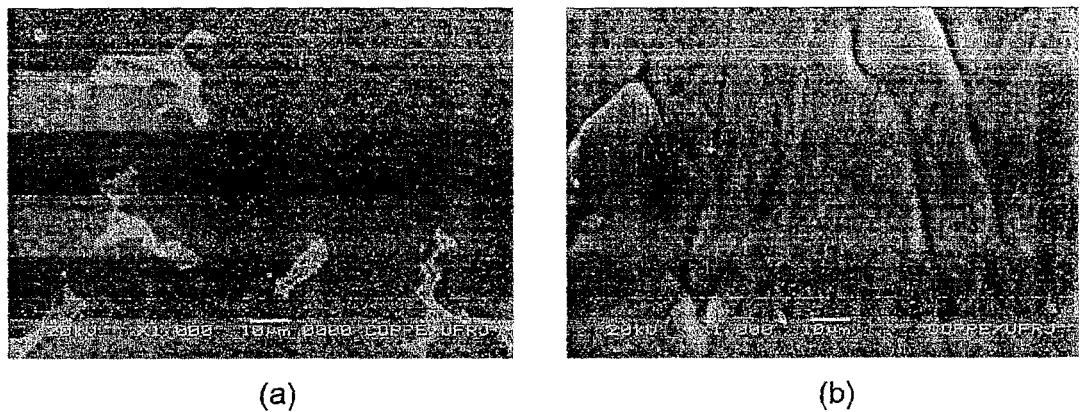

(51) Int. Cl.
  *C22C 1/00* (2006.01)
  *C22C 45/00* (2006.01)
  *F17C 11/00* (2006.01)
  *H01M 4/38* (2006.01)
  *H01M 4/46* (2006.01)
  *C22C 23/02* (2006.01)
  *C22C 23/06* (2006.01)

(52) U.S. Cl.
  CPC ............... *H01M 4/46* (2013.01); *H01M 4/463* (2013.01); *H01M 4/466* (2013.01); *Y02E 60/321* (2013.01); *Y02E 60/327* (2013.01)

(56) References Cited

OTHER PUBLICATIONS

Guo Z.X. "Comparative study of mechanical alloying of (Mg+Al) and (Mg+Al+Ni) mixtures for hydrogen storage." Journal of Alloys and Compounds 336 (2002) 222-231.*

Hehmann. "Corrosion inhibitiono in magensium-aluminium-based alloys induced by rapid solidification processing." Journal of Materials Science 24 (1989) 2369-2379.*

* cited by examiner

MAGNESIUM BASED-ALLOYS FOR HYDROGEN STORAGE

FIELD OF THE INVENTION

The present invention concerns the production of magnesium based-alloys with addition of transition and/or rare earth elements for reversible hydrogen storage. These alloys were produced by conventional induction melting and by rapid solidification.

BACKGROUND OF THE INVENTION

Nowadays, different alloys are known for their capacity of reversible hydrogen storage which may be divided into two groups: alloys with absorption/desorption temperatures lower than 100° C. (373 K) at atmospheric pressure and hydrogen storage capacity up to 2 wt. %, such as reported by Sapru et al., in U.S. Pat. No. 6,616,891, September 2003; said alloy with chemical composition consisting of $Ti_{(30-35\ at.\ \%)}$—$V_{(25-30\ at.\ \%)}$—$Cr_{(25-30\ at.\ \%)}$—$Mn_{(10-15\ at.\ \%)}$ has a reversible hydrogen desorption capacity over 2.8 wt. %, at a temperature close to 150° C.; and by Lee et al., in U.S. Pat. No. 5,888,317, March 1999, said alloy with chemical composition consisting of Ti—Zr—Mn—Cr—V—X, wherein X (Fe, Al or Ni) has a hydrogen storage capacity of 2.03 wt. % at 30° C. (303 K); and alloys with hydrogen absorption/desorption temperatures higher than 250° C. at atmospheric pressure and hydrogen storage capacity greater than 3 wt. %. The magnesium based-alloys are included within this group. Magnesium, as magnesium hydride ($MgH_2$), has the greatest theoretical hydrogen storage capacity, 7.6% in weight basis, among all metals.

However, magnesium has some shortcomings for practical use as a hydrogen storage medium, such as: slow hydrogen absorption/desorption kinetics, poor ability for dissociating the hydrogen molecules on its surface and the high stability of the magnesium hydride, because of strong bonds between magnesium and hydrogen atoms. Additionally, the activation process in magnesium based-alloys is complex, as mentioned by Ovshinsky et al., in U.S. Pat. No. 6,746,645, June 2004, which referenced the U.S. Pat. No. 3,479,165, November 1969, this latter having disclosed that for eliminating surface barriers it is necessary to use temperatures between 400 and 425° C. (673 and 698 K) at pressures close to ~7 MPa for several days.

Different alternatives for trying to resolve the problems associated to magnesium and its alloys have been proposed. Such alternatives include the following: 1) Sapru et al., in U.S. Pat. No. 6,103,024, August 2000, used mechanical alloying to produce the $Mg_{(75-95\ at.\ \%)}$—$Ni_{(5-15\ at.\ \%)}$—$Mo_{(0.5-6\ at.\ \%)}$ alloy, with addition of at least one element among Al, C, Ca, Ce, Co, Cr, Cu, Fe, Dy, La, Mn, Nd, Si, Ti, V and Zr, with a concentration between 1-15 at. %, said alloy has a hydrogen storage capacity between 3.2 and 5.7 wt. % at 300° C. (573 K); 2) Ovshinsky et al., in U.S. Pat. No. 4,431,561, February 1984, modified magnesium structurally and chemically through the "sputtering" technique with addition of one or more elements from the group of elements consisting of C, O, Fe, Al and Cu; for example, the Mg—C—O—Cu alloy reached a hydrogen storage capacity of 5.9 wt. % at 300° C. (573 K); 3) Schulz et al., in U.S. Pat. No. 5,964,965, October 1999, produced alloys by mechanical grinding or mechanical alloying in nanocrystalline powder form, satisfying the chemical composition $M_{1-x}A_xD_y$, wherein, M: Mg or Be; A: preferably Zr, Ti, Ni; D: preferably Pd; x in the range between zero and 0.3, and y in the range between zero and 0.15; which reached hydrogen absorption capacity as high as 6.6 wt. % at 230° C. (503 K); 4) Ovshinsky et al., in U.S. Pat. No. 6,746,645, June 2004, produced a magnesium alloy in the form of fine particles with chemical composition $Mg_{(90\ wt.\ \%)}$—$Ni_{(0.5-2.5\ wt.\ \%)}$-$Mm_{(1-4\ wt.\ \%)}$, wherein Mm comprises predominantly Ce, La, Pr, and with addition of one or more elements from the group consisting of Al, Y and Si, presented a hydrogen storage capacity over 6 wt. % at 300° C. (573 K), and a life cycle of at least 500 cycles without loss of initial capacity; 5) Young et al., in U.S. Pat. No. 6,726,783, April 2004, fabricated alloys of chemical composition $Mg_{(90\ wt.\ \%)}$—$Ni_{(0.5-2.5\ wt.\ \%)}$-$Mm_{(1-5.5\ wt.\ \%)}$, where Mm consists predominantly of Ce, La, Pr, Nd, and further including one or more elements from the group of Al, Y, B, C, Si, preferably produced by gas atomization with particle size between 30 and 70 μm, which presented a hydrogen storage capacity well over 6 wt. %, and hydrogen absorption kinetics such that 80% of its total capacity was absorbed within five minutes at 300° C.

As mentioned above, important advances with respect to hydrogen properties in the magnesium based-alloys have been achieved, with marked attention in the adjustment of chemical composition using transition elements; which, due to its chemical nature, can modify the character and the strength of the ionic and/or covalent bonds between magnesium and hydrogen atoms, to reduce the high magnesium hydride thermodynamic stability. Improvements also have been made on fabrication techniques.

The magnesium based-alloys of this invention resulted from the combination of factors such as the addition of transition and rare earth elements to the magnesium matrix, and the use of fabrication techniques as induction melting and rapid solidification.

The alloying elements were selected in accordance to the following premises:

1) the stability of the magnesium hydride is influenced by changes in the crystallographic characteristics and in the nature of the chemical bonds. The addition of transition elements such as Ti (3d), Fe (3d), Ni (3d), Cu (3d), Nb (4d) causes changes in the unit cell volume. For example, the addition of aluminum is associated to an increase of 46.21 kJ/mol $H_2$ in the total energy of the $MgH_2$—Al system, which is reflected on the weakening of Mg—H bonds, improving the hydrogen storage properties, as mentioned by Song, Y. et al., in "Influence of Selected Alloying Elements on the Stability of Magnesium Dihydride for Hydrogen Storage Applications: A First-Principles Investigation," Physical Review, B 69, pp. 1-11, 2004. On the other hand, Chen et al., in "Alloying Effects of Transition Metals on Chemical Bonding in Magnesium Hydride $MgH_2$", Acta Materialia, 52, pp. 521-528, 2004, evidenced the effect of 3d and 4d transition elements on the electronic structure of magnesium hydride. Thus, elements such as Zr (4d), Y (4d) and Sc (3d) reduce the $MgH_2$ thermodynamic stability, possibly due to their effect on increasing unit cell volume.

Some catalytic transition elements, as for example, Fe (3d), Ni (3d) and Co (3d), have the ability of improving the hydrogen absorption/desorption kinetics. For instance, in the hydrogenation process and due to the good Ni mobility in Mg, it is possible that a stable second phase, $Mg_2NiH_4$, could be formed. This phase presents a heat of formation of 62.7 kJ/mol $H_2$, which is larger than that of $MgH_2$, so, the hydrogen atoms in the mixture of $MgH_2$ and $Mg_2NiH_4$ compounds can be released more readily than those in solely $MgH_2$. On the other hand, nickel has a high dissociation capacity of the hydrogen molecule.

Rare earth and some transition elements act as catalysts for the dissociation of hydrogen molecules. They assist the hydrogen absorption/desorption reactions improving the hydriding/dehydriding kinetics. Yamada et al., in "Hydrogen Storage Properties and Phase Structures of Mg Rich Mg—Pd, Mg—Nd and Mg—Pd—Nd Alloys", Materials Transactions, 42, pp. 2415-2421, 2001, and Yin et al., in "Hydrogen Storage Properties and Structure Characterization of Melt-Spun and Annealed Mg—Ni—Nd Alloy", Materials Transactions, 43, pp. 417-420, 2002; have shown that the addition of rare earth elements to magnesium, specifically Nd, improves the hydrogen absorption and desorption kinetics, due to the catalytic action of the neodymium hydride on the dissociation or on the recombination of the hydrogen molecule.

The following premises were adopted concerning the fabrication procedures:

1) rapid solidification is a melting process that presents advantages such as: metallic ribbons with thickness in the range from 30 to 200 µm can be produced, which will be beneficial to improve the hydrogen absorption/desorption kinetics. Problems associated to precipitation of near-surface hydride phase can be reduced and as mentioned by Pedersen et al., in "The Formation of Hydride in Pure Magnesium Foils", Journal of the Less Common Metals, 131, pp. 31-40, 1987, magnesium foils thicker than 60 µm may remain with some non-reacted metallic magnesium after hydrogenation.

2) also, depending on the alloy's chemical composition and the operation parameters it is possible to produce amorphous and/or nanocrystalline microstructures by rapid solidification. Amorphous and/or nanocrystalline microstructures present a large number of interfaces and grain boundaries that promote the absorption of hydrogen, providing easy pathways for hydrogen diffusion. Thus, in a microstructure formed by amorphous and nanocrystalline phases, the amorphous phase leads to an easier access of hydrogen to the nanograins, avoiding the diffusion of hydrogen through the already formed hydride, as mentioned by Spassov, T. et al., in "Hydrogenation of Amorphous and Nanocrystalline Mg-Based Alloys" Journal of Alloys and Compounds, 287, pp. 243-250, 1999. Thin ribbons of magnesium-based alloys are less prone to undergo decrepitation upon hydriding.

DETAILED DESCRIPTION OF THE INVENTION

This invention describes magnesium based-alloys for reversible hydrogen storage produced by conventional induction melting and by rapid solidification. The latter comprises the conventional induction melting followed by rapid solidification by melt spinning. The chemical composition of the magnesium based-alloys is the following:

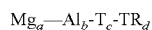

$$Mg_a\text{—}Al_b\text{-}T_c\text{-}TR_d$$

wherein
T is at least one metal selected from the group consisting of: Ti (3d), V (3d), Cr (3d), Fe (3d), Co (3d), Ni (3d), Cu (3d), Zr (4d), Nb (4d), Mo (4d), Pd (4d), Y (4d); and,
TR is at least one metal selected from the group consisting of rare earth elements such as: La, Ce, Pr, Nd, Sm and Er;
wherein
a ranges from about 0.40 to about 0.95
b ranges from about zero to about 0.20
c ranges from about zero to about 0.30; and,
d ranges from about zero to about 0.40.

The magnesium based-alloys were produced by conventional induction melting and by rapid solidification in a melt-spinner equipment. To be successful on the production of the alloys many technical problems caused by the high vapor pressure and high reactivity of magnesium had to be solved. Sulphur hexafluoride ($SF_6$) was used together with pure argon for preventing the problems associated to the evaporation of magnesium. In the case of alloys produced as thin ribbons by rapid solidification, a pre-charge with a composition similar to that of the required alloy is used. Thin metallic ribbons with thickness between 30 and 150 µm are obtained by rapid solidification.

The latter, is an important advantage for hydrogen storage due to the possibility of achieving greater surface areas, therefore favoring the hydriding and dehydriding processes. Thus, for example, during the decomposition of magnesium hydride, there are more nucleation sites for magnesium and the hydrogen diffusion pathways are shorter. On the other hand, the decrepitation process, which is the result of volume changes during the formation and decomposition of the hydride, is reduced in thin ribbon form magnesium alloys. That is, the larger the surface area of the material, the smaller is the resultant deformation for the same force induced on the material.

For alloys produced by conventional induction melting, samples in the form of discs with a thickness of about 1 mm were evaluated. The crystalline phases and microstructures were characterized by X Ray Diffraction (XRD) and Scanning Electron Microscopy (SEM-EDS). The hydrogen properties were evaluated in a Sievert-type equipment.

As previously mentioned, magnesium based-alloys were preferably produced by induction melting and by rapid solidification. Those alloys showed excellent properties of hydrogen absorption/desorption kinetics and of reversible hydrogen storage capacity, being able to store over 6 wt. % hydrogen at temperatures lower than 300° C. (573 K).

Magnesium alloys with similar hydrogen properties to the ones reported in this invention are for example: 1) the magnesium alloys reported in U.S. Pat. No. 5,964,965 October 1999 by Schulz et al., produced by mechanical grinding in nanocrystalline particles form, using Pd as catalytic element, which presented reversible hydrogen absorption capacity of 6.6 wt. % at 230° C. (503 K), and for which activation was not required; 2) the magnesium alloys disclosed in U.S. Pat. No. 6,726,783 April 2004 by Young et al., produced by gas atomization in powder form with particle size between 30 and 70 µm, which presented hydrogen storage capacity well over 6 wt. %, and an absorption kinetics such that the alloy absorbs 80% of its total capacity within 5 minutes at 300° C. (573 K); 3) the magnesium alloys reported in U.S. Pat. No. 4,431,561 February 1984 by Ovshinsky et al., produced preferably by "sputtering" techniques, where, for example, the Mg—C—O—Cu alloy presented a hydrogen storage capacity of 5.9 wt. % at 300° C. (573 K), and the Mg—Fe—Al alloy presented hydrogen absorption capacity close to 5.5 wt. % at 255° C. (528 K); 4) the magnesium alloys disclosed in U.S. Pat. No. 6,746,645 June 2004 by Ovshinsky et al., produced by mechanical grinding with particle size between 30 and 70 µm, which presented hydrogen storage capacity over 6 wt. %, and an absorption kinetics such that the alloy absorbs 80% of its total capacity within 10 minutes at 300° C. (573 K), with a life cycle of at least 500 cycles without loss of the initial capacity; and 5) the magnesium alloys reported in U.S. Pat. No. 6,103,024 August 2000 by Sapru et al., produced by mechanical alloying with hydrogen storage capacities between 3.2 and 5.7 wt. % at 300° C. (573 K).

The improvement on hydrogen properties of the magnesium based-alloys mentioned above is due mainly to the presence of amorphous and/or nanocrystalline phases, which were achieved through mechanical grinding or mechanical alloying procedures. These procedures induce microstructural defects that eliminate the activation barriers, and, aided by the increase on specific area, improve the hydrogen absorption/desorption kinetics, not requiring the activation process to be performed. This was demonstrated by Zaluski, L. et al., in "Nanocrystalline Metal Hydrides", Journal of Alloys and Compounds, 253-254, pp. 70-79, 1997; Gross, K. J., et al., in "Mechanically Milled Mg Composites for Hydrogen Storage: The Relationship between Morphology and Kinetics", Journal of Alloys and Compounds, 269, pp. 259-270, 1998 and Hout, J. et al., in "Mechanically Alloyed Metal Hydride Systems", Applied Physics A, 72, pp. 187-195, 2001.

However, mechanical alloying and mechanical grinding have important disadvantages, mainly concerning large scale production, as for example: pyroforic behavior and oxidation of the powder produced, the powder adhesion on mill elements, the powder contamination and the long processing times used. These disadvantages are eliminated using induction melting and/or rapid solidification. Furthermore, these fabrication procedures are less complex when compared with procedures such as mechanical alloying, mechanical grinding, gas atomization and sputtering.

Using the induction melting and rapid solidification processes in combination with specific composition ranges it is possible to produce magnesium alloys with particular microstructures, which may help achieving high hydrogen storage capacities at temperatures lower than 300° C. (573 K); to reduce drastically the hysteresis gap between the absorption and desorption cycle; to reduce the time needed for the activation procedure and to improve the hydrogen absorption/desorption kinetics, as it is demonstrated in this invention.

The potential applications of the magnesium based-alloys proposed in this invention include all situations in which the hydrogen storage is necessary and where a heat source is available.

The following examples demonstrate the improvement on hydrogen properties of the magnesium alloys produced by conventional induction melting and/or by rapid solidification. These examples are presented for illustrative purposes, and do not limit the present invention.

EXAMPLES

Example 1

This example demonstrates the influence of the fabrication procedures on the hydrogen properties in magnesium based-alloys.

Figure 2:
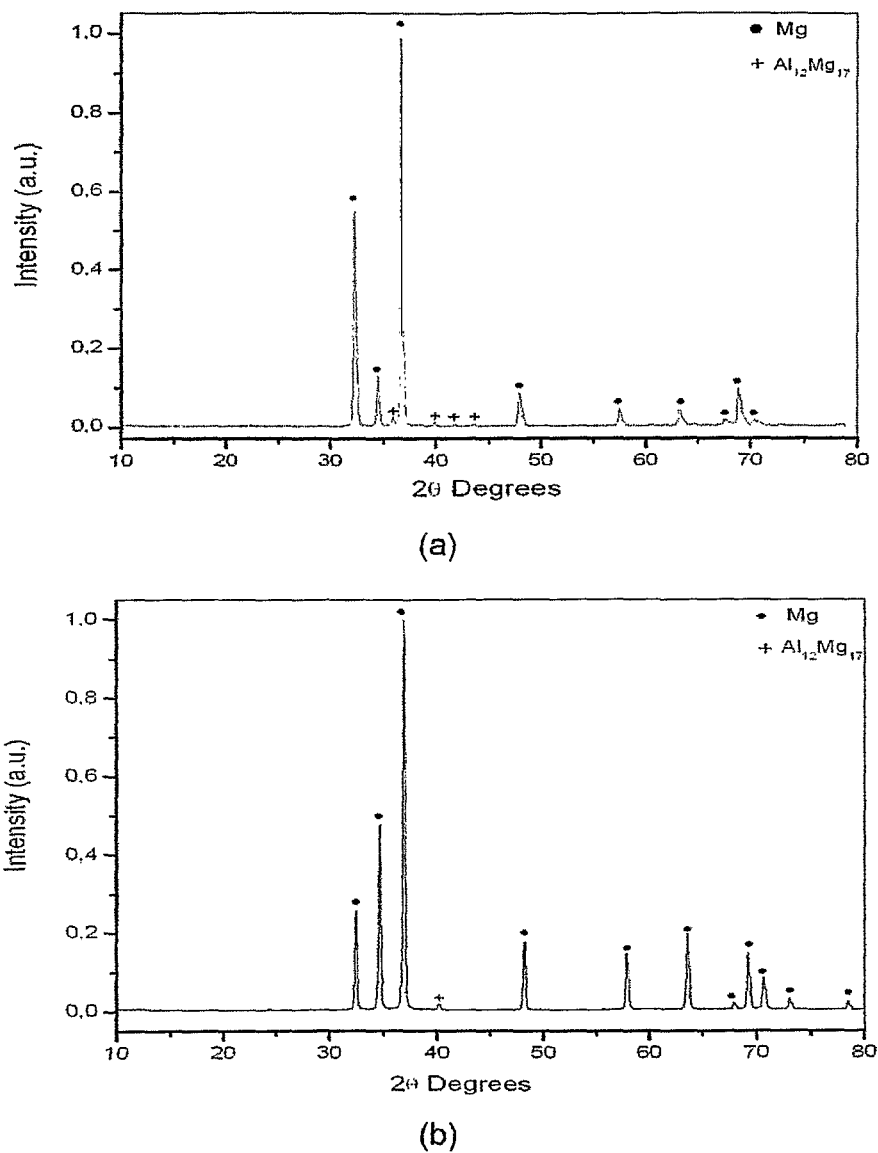

The magnesium alloy with the chemical composition $Mg_a$—$Al_b$-$T_c$-$TR_d$, where a is in the range of 0.90 to 0.95; b is in the range of 0.05 to 0.10; c and d zero, was produced by induction melting and by rapid solidification. In the first case, samples with the shape of a disc and with thickness of about 1 mm were evaluated, and in the second case, the samples evaluated possessed a ribbon form with thickness of about 108 μm. The microstructures and the X ray diffractograms of the samples produced by conventional induction melting and by rapid solidification are shown in FIGS. 1 and 2, respectively.

In the microstructure of the magnesium alloy produced by conventional induction melting a magnesium matrix with lamellar eutectic precipitates is observed. The eutectic precipitates are composed by a solid solution of aluminum in magnesium and the $Al_{12}Mg_{17}$ intermetallic, FIG. 1(a). The microstructure of the magnesium alloy produced by rapid solidification is composed mainly by a solid solution of aluminum in magnesium; the $Al_{12}Mg_{17}$ intermetallic is not easily perceptible, FIG. 1(b). This, is in accordance with the X ray diffractograms shown in FIGS. 2(a) and 2(b).

The hydrogen properties of magnesium alloys produced by conventional induction melting and by rapid solidification were measured using a Sievert-type equipment. The hydrogen desorption pressure-composition isotherms were measured at temperatures equal to 400, 350 and 300° C. (673, 623 and 573 K), FIGS. 3 and 4. The hydrogen storage capacity as a function of the desorption temperature and pressure for such magnesium alloys is presented in Table 1. As observed and previously mentioned, the hydrogen properties of the samples produced by rapid solidification are improved due to a greater specific area, and therefore a larger volumetric fraction is transformed to hydride.

The magnesium alloy with the chemical composition $Mg_a$—$Al_b$-$T_c$-$TR_d$, where a is in the range of 0.90 to 0.95; b is in the range of 0.05 to 0.10; c and d zero, produced by rapid solidification in ribbon form presented a hydrogen storage capacity of at least 3.7 wt. % at 300° C. (573 K) at a pressure plateau close to 2.4 atm (0.24 MPa).

Figure 3:
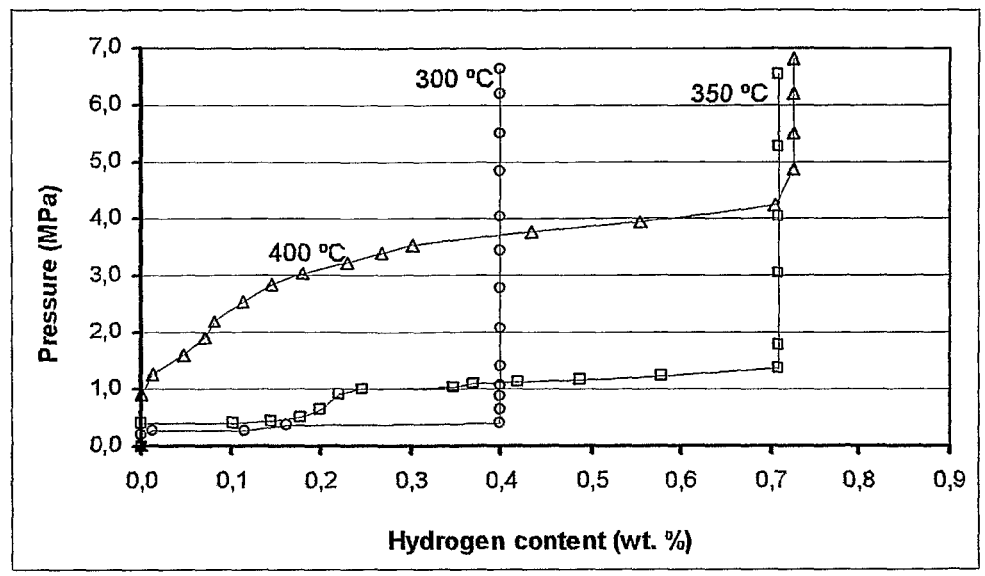
Figure 4:
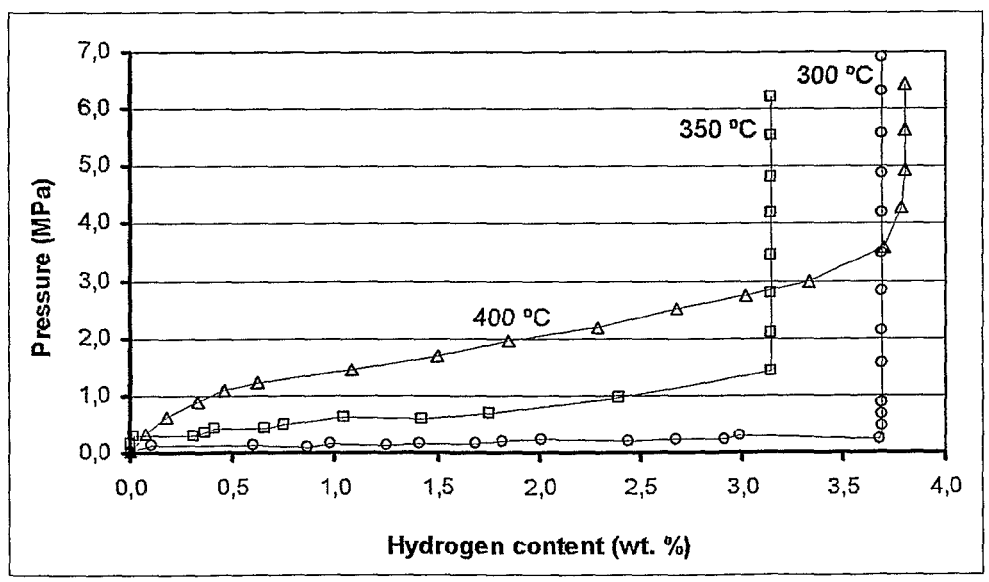

Using the pressure-composition isotherms, FIGS. 3 and 4, and the Van't Hoff diagram, the desorption temperatures at the pressure of 1 atm were calculated. In the samples produced by conventional induction melting in the form of discs, this temperature was 256° C. (529 K), and for the samples produced by rapid solidification, this temperature was 268° C. (541 K). These results when compared with the data reported by Sandia National Laboratories, for which the desorption temperature at the pressure of 1 atm is 279° C. (552 K), for $MgH_2$, demonstrates the aluminum influence on the weakening of Mg—H bonding, as it was theoretically disclosed by Song, Y. et al., in "Influence of Selected Alloying Elements on the Stability of Magnesium Dihydride for Hydrogen Storage Applications: A First-Principles Investigation", Physical Review, B 69, pp. 1-11, 2004; by Bououdina et al., in "Comparative Study of Mechanical Alloying of (Mg+Al) and (Mg+Al+Ni) Mixtures for Hydrogen Storage", Journal of Alloys and Compounds, 336, pp. 222-231, 2002, and herein demonstrated experimentally.

The aluminum addition to the magnesium matrix reduced the magnesium hydride desorption temperature.

TABLE 1

Hydrogen desorption properties for the Mg—5Al alloy

| Material | Thickness | Desorption Temperature (° C.) | Hydrogen Desorption (wt. %) | Desorption Pressure (MPa) |
|---|---|---|---|---|
| Sample of Mg—5Al alloy in the form of discs produced by conventional induction melting. | 1 mm | 400 (673 K) | 0.7 | 3.4-4.2 (34-42 atm) |
| | | 350 (623 K) | 0.7 | 0.95-1.4 (9.5-14 atm) |
| | | 300 (573 K) | 0.4 | 0.35-0.4 (3.5-4.0 atm) |

TABLE 1-continued

Hydrogen desorption properties for the Mg—5Al alloy

| Material | Thickness | Desorption Temperature (° C.) | Hydrogen Desorption (wt. %) | Desorption Pressure (MPa) |
|---|---|---|---|---|
| Sample of Mg—5Al alloy in ribbon form produced by rapid solidification. | 108 μm | 400 (673 K)<br>350 (623 K)<br>300 (573 K) | 3.8<br>3.1<br>3.7 | 1.9-3.0 (19-30 atm)<br>0.7-1.4 (7-14 atm)<br>0.24 (2.4 atm) |

The following examples demonstrate the influence of transition and rare earth elements on the hydrogen properties in magnesium alloys. The magnesium based-alloys were produced by conventional induction melting.

Example 2

Figure 5:
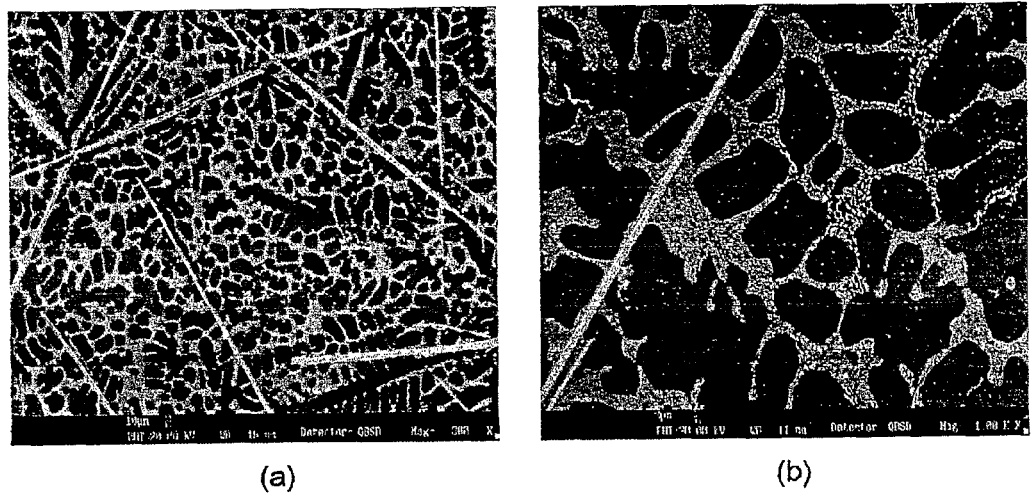

The magnesium based-alloy possessing the chemical composition $Mg_a$—$Al_b$-$T_c$-$TR_d$, where T is preferably Ni (3d); and TR is preferably Nd, where a is in the range of 0.60 to 0.85; b is in the range of 0.05 to 0.10; c is in the range of 0.05 to 0.10; and d is in the range of 0.05 to 0.20, was produced by conventional induction melting. Disk-shaped samples of the as-cast alloy with a thickness of about 1 mm were evaluated by pressure-composition isotherms and desorption kinetic curves in the temperature range between 300 and 400° C. (573 and 673 K) in a Sievert-type equipment. The microstructures before and after the hydrogenation procedure are shown in FIGS. 5(a) and 5(b), respectively.

The crystalline phases identified before the hydrogenation procedure were: Mg, $Mg_{12}Nd$, AlNiNd, $AlNi_3$ and Nd, FIG. 5(a). Upon hydrogenation, microstructural changes were observed and the crystalline phases identified were: $MgH_2$, $Nd_2H_5$, $Mg_2NiH_4$, $Al_3Ni_2$ and residual metallic magnesium. It was observed that the $Mg_{12}Nd$ and AlNiNd phases presented a morphology similar to a eutectoid microstructure after hydrogenation, FIG. 5(b).

Figure 6:
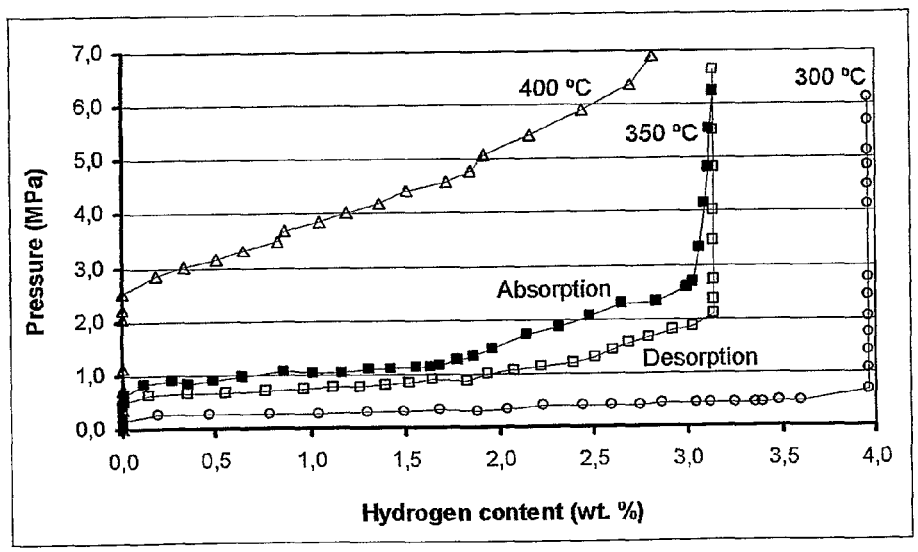
Figure 7:
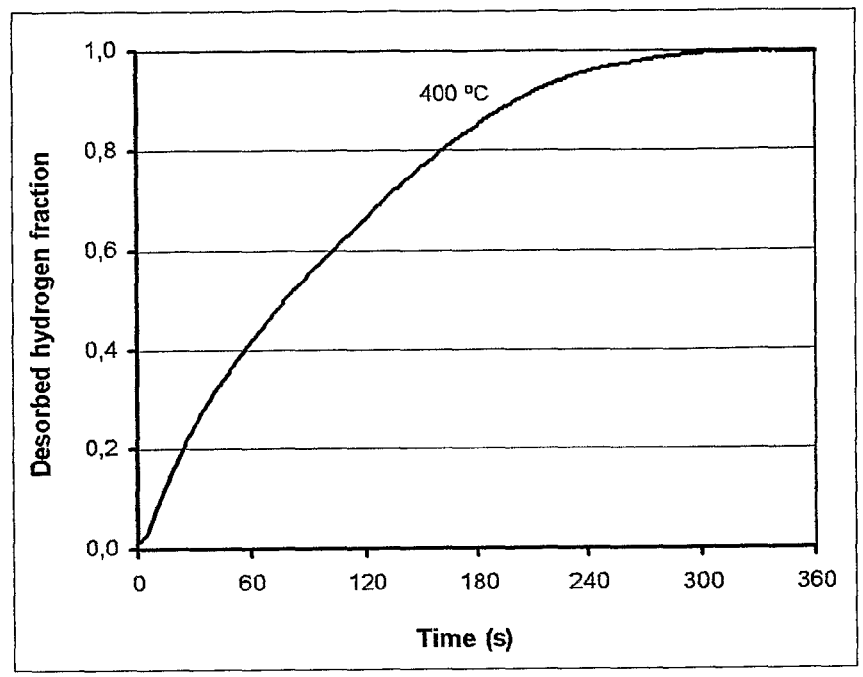

The pressure-composition isotherms of the Mg—Al—Ni—Nd alloy at the temperatures of 400, 350 and 300° C. (673, 623 and 573 K) are shown in FIG. 6. At 300° C. (573 K), this alloy presented a hydrogen storage capacity of at least 4 wt. % and a desorption pressure of 3 atm. (0.3 MPa), FIG. 6. The hydrogen content in the Mg—Al—Ni—Nd alloy as a function of desorption temperature and pressure is presented in Table 2. The hysteresis gap between the absorption/desorption cycle at 350° C. (623 K) was very small, mainly in the pressure plateau related to $MgH_2$ formation, as depicted in FIG. 6. The hydrogen desorption kinetic curves evidenced that 97% of the stored hydrogen was released during the first five minutes at 400° C. (673 K), FIG. 7. Similar behavior was observed at 350 and 300° C. (623 and 573 K).

The hydrogen desorption kinetics is favored mainly due to the addition of neodymium, which is transformed into neodymium hydride ($Nd_2H_5$) during the hydrogenation procedure, playing a catalytic role on the dissociation and recombination of hydrogen molecules. Furthermore, several interfaces present in the microstructure offer short-circuit pathways to facilitate the hydrogen diffusion.

The desorption temperature calculated for the desorption pressure of 1 atm was found to be equal to 250° C. (523 K). This represents an important reduction when compared to 279° C. (552 K), which is the conventional $MgH_2$ hydrogen desorption temperature.

TABLE 2

Hydrogen desorption properties for the Mg—Al—Ni—Nd alloy

| Material | Desorption Temperature (° C.) | Hydrogen Desorption (wt. %) | Desorption Pressure (MPa) |
|---|---|---|---|
| Sample of Mg—Al—Ni—Nd alloy, produced by induction melting. | 400 (673 K)<br>350 (623 K)<br>300 (573 K) | 2.8<br>3.1<br>4.0 | 5.4-6.2 (54-62 atm)<br>0.7-1.0 (7-10 atm)<br>0.3 (3 atm) |

Example 3

The magnesium based-alloy with the chemical composition $Mg_a$—$Al_b$-$T_c$-$TR_d$, where T is preferably Ni (3d), TR is preferably Nd, where a is in the range of 0.40 to 0.90; b zero; c is in the range of 0.05 to 0.25; and d is in the range of 0.05 to 0.35; was produced by induction melting. Disk-shaped samples of the as-cast alloy by conventional induction melting with a thickness of about 1 mm were evaluated at the temperatures of 375, 350, 300, 250 e 230° C. (648, 623, 573, 523 e 503 K) in a Sievert-type equipment.

Figure 8:
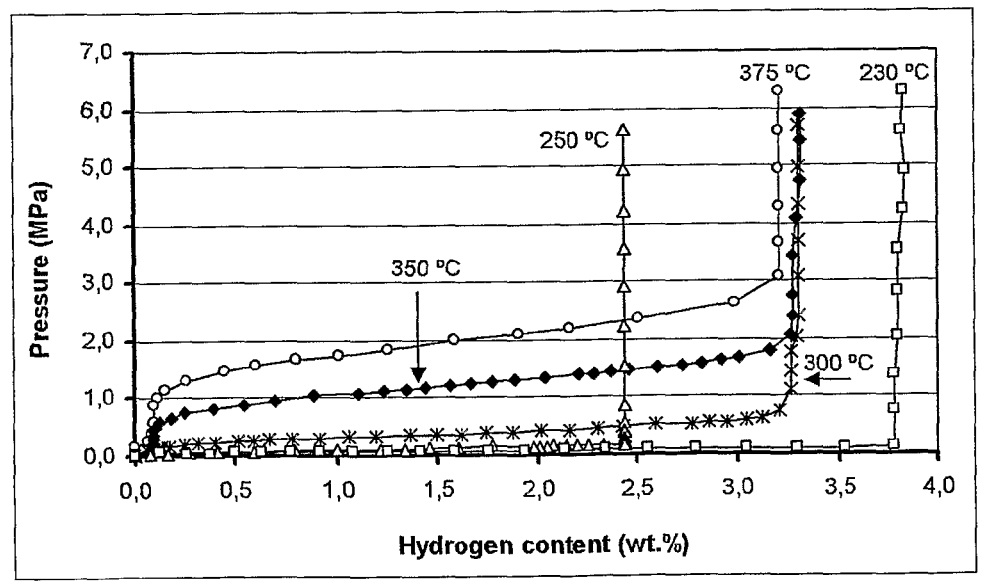
Figure 9:
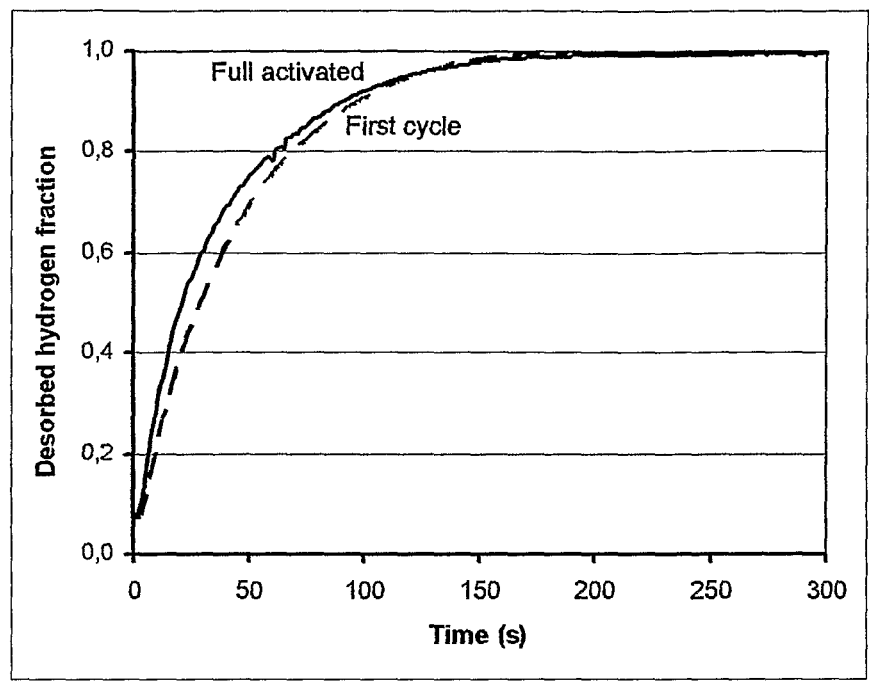

The desorbed hydrogen capacity as a function of desorption temperature and pressure is presented in Table 3. This alloy presented a hydrogen desorption capacity of at least 3.8 wt. %, at 230° C. (503 K), FIG. 8, and excellent kinetics. The hydrogen desorption kinetic curves in the first and in the maximum activation cycles are shown in FIG. 9. The Mg—Ni—Nd alloy achieved the highest hydrogen storage capacity since the first activation cycle. Submitting the alloy to long periods under high hydrogen pressure and temperature, which are commonly required in the magnesium based-alloys, as mentioned in U.S. Pat. No. 3,479,165, November 1969 and by Schulz et al., in U.S. Pat. No. 5,964,965, were not necessary in this case.

The Mg—Ni—Nd alloy presented a desorption kinetics such that about 92% of the stored hydrogen is released within 2 minutes at 375° C. (648 K), FIG. 9. Similar behavior was observed at the other temperatures.

TABLE 3

Hydrogen desorption properties for the Mg—Ni—Nd alloy

| Material | Desorption Temperature (° C.) | Hydrogen Desorption (wt. %) | Desorption Pressure (MPa) |
|---|---|---|---|
| Sample of Mg—Ni—Nd alloy, produced by conventional induction melting. | 375 (648 K)<br>350 (623 K)<br>300 (573 K)<br>250 (523 K)<br>230 (503 K) | 3.2<br>3.3<br>3.3<br>2.5<br>3.8 | 1.6-2.3 (16-23 atm)<br>1.0-1.5 (10-15 atm)<br>0.3-0.5 (3-5 atm)<br>0.07-0.14 (0.7-1.4 atm)<br>0.06 (0.6 atm) |

Example 4

The magnesium based-alloy with the chemical composition $Mg_a$—$Al_b$-$T_c$-$TR_d$, where T is preferably a combination of Ni (3d) and Y (4d), where a is in the range of 0.60 to 0.85; b is in the range of 0.05 to 0.10; c is in the range of 0.05 to 0.20 and d zero, was produced by induction melting. Disk-shaped conventional induction melted samples with a thickness of about 1 mm were evaluated at the temperatures of 375, 350, 300 and 250° C. (648, 623, 573 and 523 K) in a Sievert-type equipment.

Figure 10:
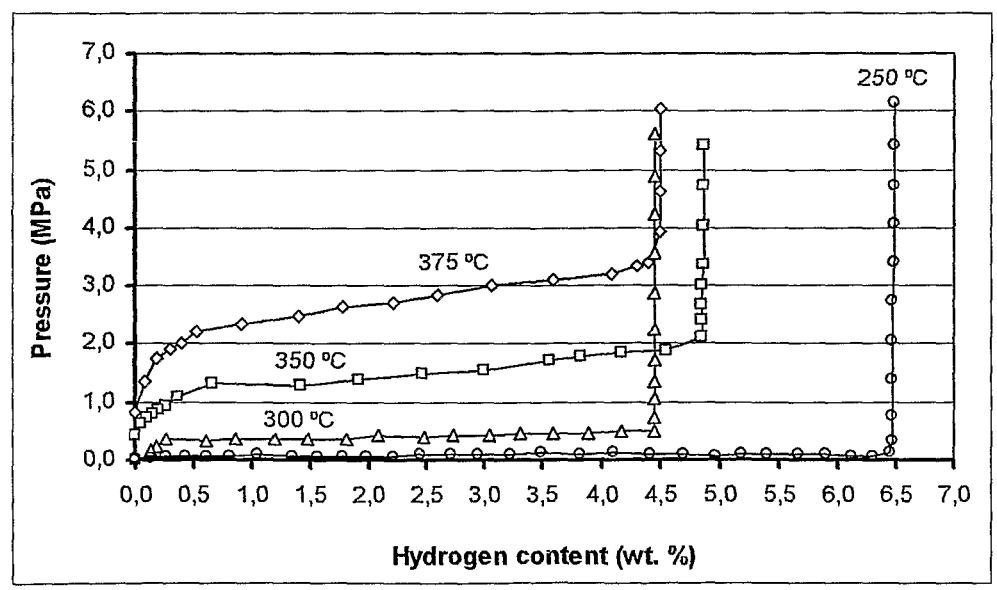
Figure 11:
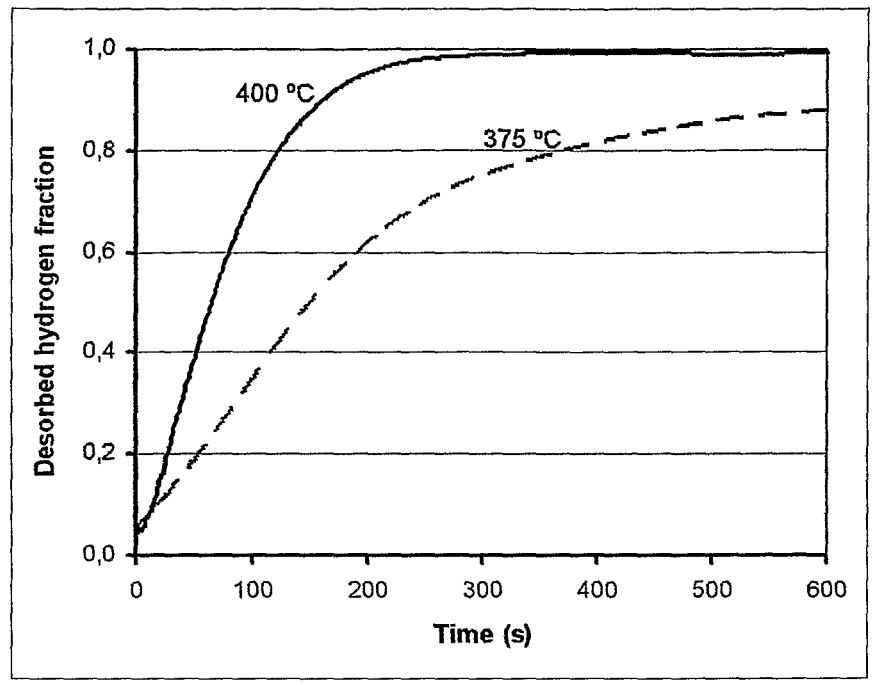

This Mg—Al—Ni—Y alloy presented a hydrogen storage capacity over 6 wt. % at 250° C. (503 K), as observed in FIG. 10. The desorption kinetics was such that 99% of the stored hydrogen is released within 5 minutes at 400° C. (673 K) and 88% is released within 10 minutes at 375° C. (648 K), FIG. 11.

Figure 12:
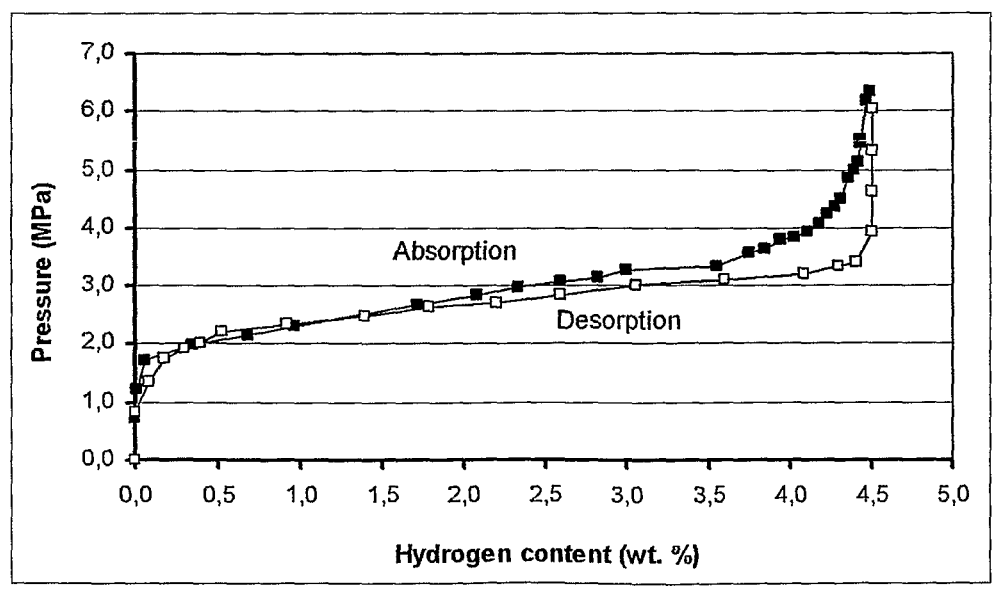

The hydrogen desorption properties as a function of pressure and temperature are presented in Table 4. An important reduction was noted in the hysteresis gap between the hydrogen absorption and desorption pressure-composition isotherms at 375° C. in the first pressure plateau, which corresponds to the $MgH_2$ formation, FIG. 12.

TABLE 4

Hydrogen desorption properties for the Mg—Al—Ni—Y alloy

| Material | Desorption Temperature (° C.) | Hydrogen Desorption (wt. %) | Desorption Pressure (MPa) |
|---|---|---|---|
| Sample of Mg—Al—Ni—Y alloy, produced by conventional induction melting. | 375 (648 K) | 4.5 | 2.5-3.1 (25-31 atm) |
| | 350 (623 K) | 4.8 | 1.3-1.5 (13-15 atm) |
| | 300 (573 K) | 4.5 | 0.35-0.4 (3.5-4.0 atm) |
| | 250 (523 K) | 6.5 | 0.08 (0.8 atm) |

The scope of the invention shall include all modifications and variations that fall within the scope of the claims. From the examples herein cited, neither the elements T and TR, nor the nominal composition of the alloys should be used as limitations to the scope of this invention.

The invention claimed is:

1. A magnesium-based alloy consisting of the chemical composition $Mg_a$-$Al_b$-$T_c$-$TR_d$, where T is at least one transition element selected from the group consisting of: Ti, V, Cr, Fe, Co, Ni, Cu, Zr, Nb, Mo, Pd, and Y; and TR is at least one rare earth element selected from the group consisting of La, Ce, Pr, Nd, Sm and Er; where a represents a range between 0.60 and 0.85; b represents a range between 0.05 and 0.10; c represents a range between 0.05 and 0.10; d represents a range between 0.05 and 0.20; and the sum of a, b, c, and d is 1.00; produced by conventional induction melting and by rapid solidification by melt spinning; the magnesium-based alloy having thin metallic ribbons of a thickness between 30 and 150 μm; wherein said alloy produced by conventional induction melting has a hydrogen reversible storage capacity of at least 4 wt. %.

2. The magnesium-based alloy of claim 1, characterized by having a desorption kinetics such that around 97% of the hydrogen stored is released within 5 minutes at 400° C.

3. A magnesium-based alloy consisting of the chemical composition $Mg_a$-$Al_b$-$T_c$-$TR_d$, where T is at least one transition element selected from the group consisting of: Ti, V, Cr, Fe, Co, Cu, Zr, Nb, Mo, Pd, and Y; and TR is at least one rare earth element selected from the group consisting of La, Ce, Pr, Nd, Sm and Er; wherein a represents a range between 0.60 and 0.85; b represents a range between 0.05 and 0.10; c represents a range between 0.05 and 0.20; d represents zero; and the sum of a, b, c, and d is 1.00; produced by conventional induction melting and by rapid solidification by melt spinning; the magnesium-based alloy having thin metallic ribbons of a thickness between 30 and 150 μm.

4. The magnesium-based alloy of claim 3, characterized by having a hydrogen reversible storage capacity of at least 4.5 wt. % at 300° C.

5. The magnesium-based alloy of claim 3, characterized by having a hydrogen reversible storage capacity of at least 6.5 wt. % at 250° C.

6. The magnesium-based alloy of claim 3, characterized by having a desorption kinetics such that 99% of hydrogen stored is released within 5 minutes at 400° C.

7. The magnesium-based alloy of claim 3, characterized by having a desorption kinetics such that 88% of hydrogen stored is released within 10 minutes at 375° C.

8. A magnesium-based alloy consisting of the chemical composition $Mg_a$-$Al_b$-$T_c$-$TR_d$, where T is at least one transition element selected from the group consisting of Ti, V, Cr, Fe, Co, Cu, Zr, Nb, Mo, Pd, and Y; and TR is at least one rare earth element selected from the group consisting of La, Ce, Pr, Nd, Sm and Er; wherein a represents a range between 0.60 and 0.90; b represents a range between 0.05 and 0.20; c represents a range between 0.05 and 0.20; d represents zero; and the sum of a, b, c, and d is 1.00; produced by conventional induction melting and by rapid solidification by melt spinning; the magnesium-based alloy having thin metallic ribbons of a thickness between 30 and 150 μm.

* * * * *